United States Patent [19]
Darden

[11] Patent Number: 5,145,270
[45] Date of Patent: Sep. 8, 1992

[54] REVERSE SLOPE KEYBOARD

[76] Inventor: Jody J. Darden, Box 231363, San Diego, Calif. 92194

[21] Appl. No.: 733,604

[22] Filed: Jul. 22, 1991

[51] Int. Cl.⁵ .................. B41J 29/06; B43L 15/00
[52] U.S. Cl. .................. 400/488; 400/490; 400/715; 248/118.3; 248/188.2
[58] Field of Search .......... 400/472, 488, 489, 490, 400/492, 681, 682, 691, 715; 340/711; 235/145 R, 145 A, 146; 248/118, 118.1, 118.3, 118.5, 118.2, 919-923

[56] References Cited

U.S. PATENT DOCUMENTS

| | | | |
|---|---|---|---|
| 674,747 | 5/1901 | Vidal | 400/488 |
| 3,387,693 | 6/1968 | Wirth | 235/145 R |
| 4,545,554 | 10/1985 | Latino et al. | 248/118.3 |
| 4,619,427 | 10/1986 | Leymann | 248/919 |
| 5,040,757 | 8/1991 | Benaway | 400/715 |

FOREIGN PATENT DOCUMENTS

| | | | |
|---|---|---|---|
| 408898 | 8/1924 | Fed. Rep. of Germany | 400/488 |
| 885074 | 11/1981 | U.S.S.R. | 400/488 |

OTHER PUBLICATIONS

IBM Technical Disclosure Bulletin "Adjustable Terminal Table," vol. 28, No. 2, Jul. 1985.

*Primary Examiner*—Edgar S. Burr
*Assistant Examiner*—Stephen R. Funk
*Attorney, Agent, or Firm*—Robert M. Sperry

[57] ABSTRACT

An improved keyboard for office machines and the like having a reversely-sloped keyboard having a wrist support member located on the raised adjacent edge of the keyboard and having the keys arranged in tiers descending in stepwise fashion toward the lower rear edge of the keyboard.

13 Claims, 2 Drawing Sheets

REVERSE SLOPE KEYBOARD

BACKGROUND

This invention relates to keyboards for use with typewriters, computers and the like and is particularly directed to improved keyboards having a reverse slope which allow the user to rest their wrists on the adjacent edge of the keyboard while typing.

PRIOR ART

Office machines, such as typewriters, computers and the like, have been known for many years and have virtually revolutionized the comfort, efficiency and productivity of office workers. However, the introduction of office machines has also introduced new problems and hazards for office workers. One such problem arises from the fact that most office machines include keyboards which are used for data entry and operation of the machines. Since the inception of the typewriter, the keyboard has been in a "stair-step" configuration, having approximately four rows of keys sloping downwardly toward the user. In use, the typist normally rests their fingers lightly on the second row of keys, which is referred to as the "home" row. Home row keys are struck directly, while the other keys are struck by reaching the fingers upward or downward, as required. Early keys featured a flat surface mounted on a riser, which was mounted on a mechanical linkage connecting the key to a respective one of the impacting characters. Finger pressure determined how hard the character would impact the paper. With the advent of electric typewriters, the keys became electric switches and an electric motor served to depress the impacting characters. This was less tiring for the typist and generally provided more uniform impacting pressure. Since finger pressure was no longer needed to depress the keys, the keyboards became flatter, with less elevation between the adjacent rows of keys, so that the fingers would have less travel distance, which would be less tiring for the typist. However, despite the lower slant, some upward reaching of the fingers was still required, sometimes resulting in the condition known as "carpel tunnel syndrome". This condition is a painful and sometimes crippling inflammation of a ligament, usually caused by repetitive wrist movements at an awkward angle. Furthermore, for typists having long fingernails, inadvertent striking of keys on the superjacent row was still a problem. Unfortunately, with a forward-sloping or even with a flat keyboard, these problems remain. Moreover, flat or forward-sloping keyboards require that, in order to be able to operate the keys of the keyboard, the user must hold their hands suspended slightly above the keyboard, with their arms unsupported from at least their elbows, for hour-after-hour throughout the entire work period. This leads to considerable fatigue and has caused serious physical problems for many workers. The best prior art attempt to alleviate the problem of typing fatigue has been to lower the elevation at which the keyboard is located below the level of a standard table or desk. However, this solution has been only partially satisfactory. Various alternative keyboard designs have also been proposed. However, these have primarily been intended to improve efficiency, rather than to provide greater comfort for the user. A search in the United States Patent Office has revealed the following references:

| U.S. Pat. No. | INVENTOR | ISSUED |
|---|---|---|
| 4,265,557 | J. M. Runge | May 5, 1981 |
| 4,482,063 | J. J. Berke et al | Nov. 13, 1984 |
| 4,483,634 | W. U. Frey et al | Nov. 20, 1984 |
| 4,876,415 | K. F. Clancy | Oct. 24, 1989 |
| 3,805,939 | L. Ross | Apr. 23, 1974 |
| 4,760,217 | M. Suzuki et al | Jul. 26, 1988 |
| 4,824,268 | Diernisse H. V. | Apr. 25, 1989 |
| 2,369,807 | P. O. Solon | Feb. 20, 1945 |

All of these patents disclose forward-sloping keyboards. Thus, none of the prior art keyboards are entirely satisfactory.

BRIEF SUMMARY AND OBJECTS OF INVENTION

These disadvantages of prior art keyboards are overcome with the present invention. An improved keyboard design is proposed which allows the typist to drape their hand in a natural position of repose and to retain this reposed position of the hand while typing, which increases the typist's speed, while greatly reducing fatigue. Also, the device of the present invention virtually eliminates inadvertent striking of adjacent keys, thus greatly improving efficiency. Furthermore, the keyboard features unique keys which have rubber or soft plastic surfaces for comfort and noise abatement and the key surfaces have a convex configuration to give a button feel to the user's fingertips. The convex shape also accomodates a user with long fingernails, because it enables the longer fingernails to extend beyond the edge of the key without striking neighboring keys because the angle created will leave the fingernail in the air above the key or there will be enough space between adjacent keys to accommodate the fingernails without striking the adjacent keys. Finally, each of the keys is mounted on a riser which enables the keys to be properly aligned and separated.

The advantages of the present invention are preferably attained by providing a reversely-sloped keyboard having a wrist support member located on the raised adjacent edge of the keyboard and having the keys arranged in tiers descending in stepwise fashion toward the lower rear edge of the keyboard. Furthermore, the device of the present invention provides convex key surfaces which enhance finger placement and which, together with the reverse-sloping of the keyboard substantially eliminate inadvertent striking of adjacent keys.

Accordingly, it is an object of the present invention to provide an improved keyboard for office machines and the like.

An additional object of the present invention is to provide an improved keyboard for office machines and the like which prevents muscle and arm strain.

Another object of the present invention is to provide an improved keyboard for office machines and the like which allows the operator to rest their wrists on a support during use of the keyboard.

An additional object of the present invention is to provide an improved keyboard for office machines which virtually eliminates the problem of inadvertent striking of adjacent keys.

A specific object of the present invention is to provide an improved keyboard for office machines and the like having a reversely-sloped keyboard having a wrist support member located on the raised adjacent edge of the keyboard and having the keys arranged in tiers descending in stepwise fashion toward the lower rear edge of the keyboard, together with convex key surfaces which enhance finger placement and which, together with the reverse-sloping of the keyboard substantially eliminate inadvertent striking of adjacent keys.

These and other objects and features of the present invention will be apparent from the following detailed description, taken with reference to the figures of the accompanying drawings.

DETAILED DESCRIPTION OF THE INVENTION

Figure 1:
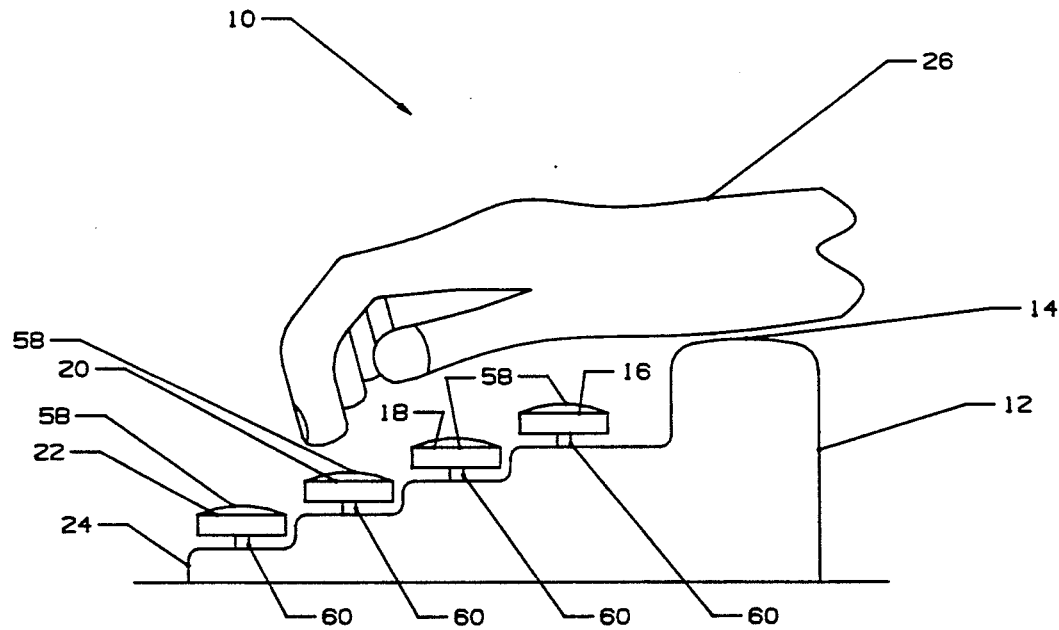
FIG. 1 is a side elevation of a keyboard embodying the present invention.

The form of the present invention chosen for purposes of illustration in the drawing, FIG. 1 shows a keyboard, indicated generally at 10, having a raised front edge 12 with a wrist support portion 14 formed on the upper surface thereof and having a plurality of tiers 16, 18, 20 and 22 of keys arranged in descending stepwise fashion toward the lower rear edge 24 of the keyboard 10. The wrist support portion 14 can easily be made high enough to provide a comfortable support for the operator's wrist 26, while still affording the operator a clear and unobstructed view of the keys 16-22.

In use, when the operator rests their wrists 26 on the wrist support portion 14, their fingers will be in position to easily and comfortably reach the keys in any of the tiers 16, 18, 20 and 22. Thus, the operator can proceed to type, enter data or provide machine instructions without ever lifting their wrists 26 from the wrist support portion 14. Consequently, the operator can work hour-after-hour throughout the entire work period in ease and comfort, with virtually no strain on their wrists or arms. Furthermore, with the reversely sloped keyboard of the present invention, the operator is not required to hold their wrists "cocked" at an awkward angle, as is required with conventional forward-sloping keyboards. Consequently, the danger of carpel tunnel syndrome and the attendant pain and suffering are virtually eliminated.

Figure 2:
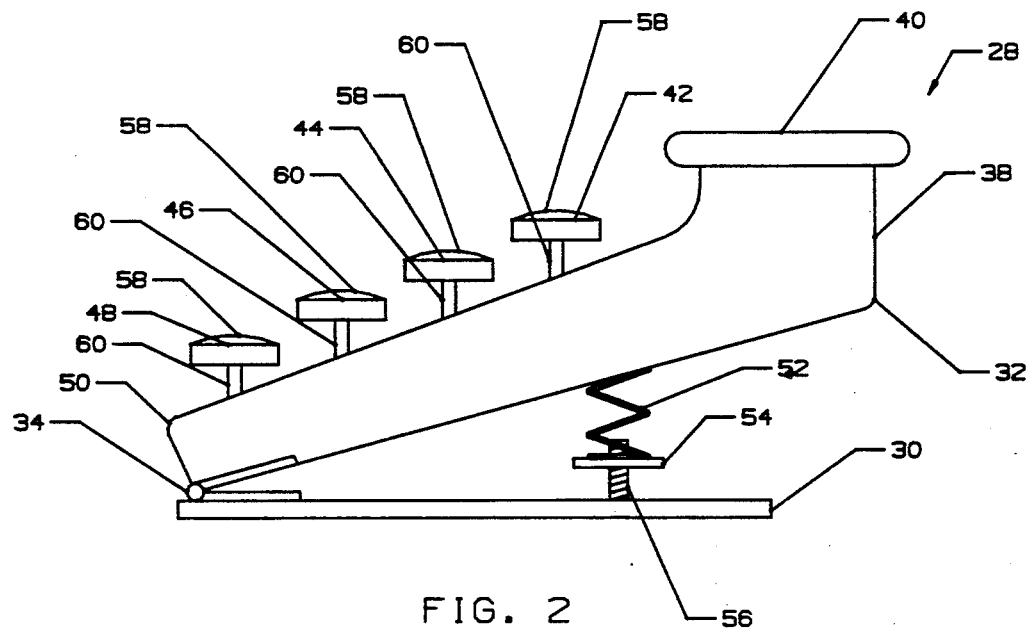
FIG. 2 is a side elevation of an alternative form of the keyboard of FIG. 1.

FIG. 2 shows an alternative form of the keyboard of the present invention, indicated generally at 28, having a base 30 with a keyboard portion 32 pivotally attached, as by hinge 34, adjacent the rear edge 50 of the base 30 and sloping upwardly toward the front end 38. A wrist support cushion 40 is mounted on top of the front end 38 of the keyboard portion 32 and a plurality of tiers 42, 44, 46 and 48 of keys arranged in descending stepwise fashion toward the lower rear edge 50 of the keyboard portion 32. For even greater comfort, resilient means, such as spring 52, is provided to normally urge the front end 38 of the keyboard portion 32 upward. Moreover, if desired, suitable adjusting means, such as wheel 54, may be provided. Adjustment wheel 54 is threadedly positionable on threaded shaft 56 to vary the tension on the spring 52.

In both FIGS. 1 and 2, it will be seen that the keys are preferably formed with convex surfaces, as seen at 58 in FIG. 2, and are mounted on risers 60. The risers 60 may be replaceable or may be made adjustable in height to permit varying the height of the keys to align and separate the keys to suit individual preferences. Moreover, the rounded or convex key surfaces 58 give a "button" feel to the user's fingertips, which is more comfortable and which considerably enhances striking of the keys and, since the buttons are made of rubber or soft plastic, this further increases the comfort and greatly reduces the noise when the finger strikes the keys. Also, the rounded surfaces 58, together with the reverse-sloping of the keyboard, serve to virtually eliminate inadvertent striking of adjacent keys, even when the typist has long fingernails.

In use, this form of the present invention is substantially identical to that of FIG. 1, except that spring 52 will allow the keyboard portion 32 to resiliently pivot about hinge 34 to compensate for the weight of the operator's wrists and to permit varying the slope of the keyboard 28 to adapt to individual preference. The tension of the spring 52 can be adjusted, as desired, by wheel 54 to provide maximum comfort for the operator.

Figure 3:
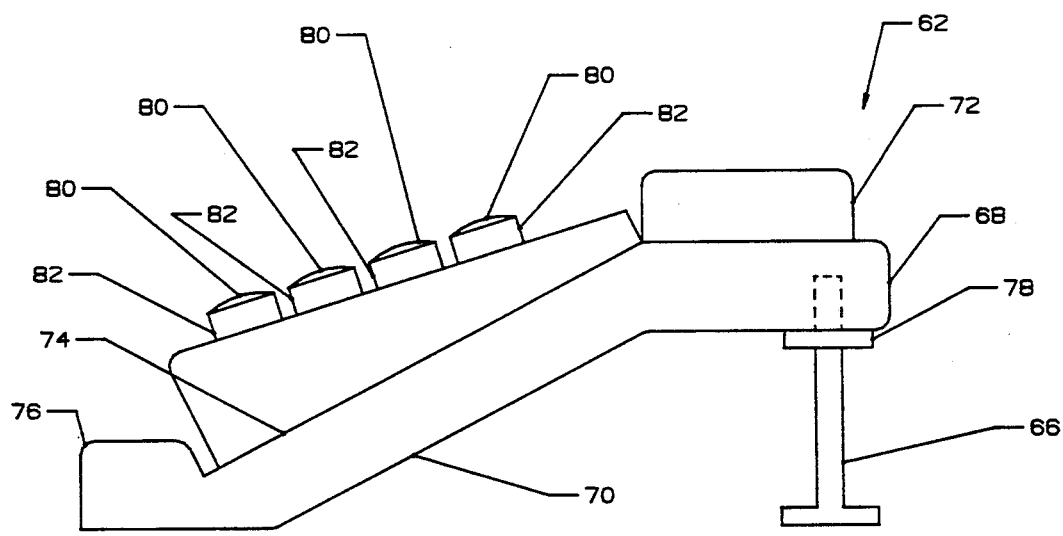
FIG. 3 is a side view of a device for converting existing keyboards to provide the advantages of the keyboard of FIG. 1.

FIG. 3 shows a stand, indicated generally at 62, which may be used with a conventional forwardly-sloping keyboard, such as that shown at 64, to provide the advantages of the keyboards 10 and 28 of the present invention. As shown, the stand 62 has substantially vertical front legs 66 supporting the front end 68 of a base member 70 and may have a resilient cushion 72 mounted on the front edge 68 of the base member 70 to provide a comfortable wrist rest for the typist. The base member 70 also has an upper surface 74 for receiving the conventional keyboard 64 and serving to support the conventional keyboard 64 in a reversely-sloping position, as shown in FIG. 3, and an end block 76 is provided on the rear end of the base member 70 to releasably retain the conventional keyboard 64 on the stand 70. If desired, the legs 66 may be threadedly attached to the base member 70 and suitable means, such as adjustment wheel 78, may be provided to permit varying the height of the front end 68 of the base member 70 and, hence, to allow the amount of reverse slope of the conventional keyboard 64 to be adapted to suit individual preferences. Finally, if desired convex caps 80 may be attached to the keys 82 of the conventional keyboard 64 to provide the advantages of the convex key surfaces shown at 58 in FIGS. 1 and 2.

Figure 4:
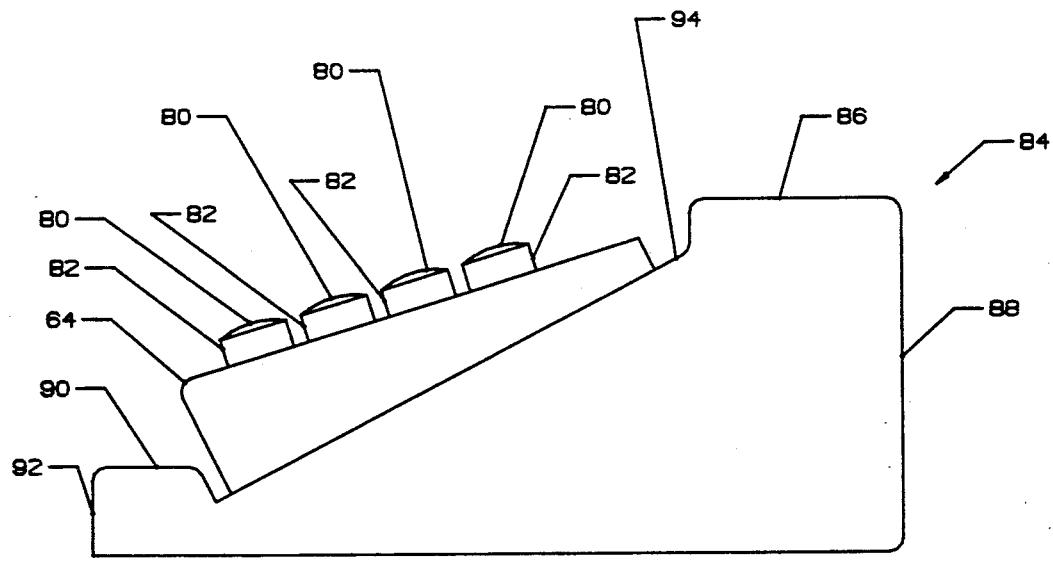
FIG. 4 is a side view of a further alternative device for converting existing keyboards to provide the advantages of the keyboard of FIG. 1.

FIG. 4 shows an alternative form of the stand of FIG. 3, indicated generally at 84, comprising a solid wedge of foam material, such as polyurethane, which is sufficiently dense to provide support for the conventional keyboard 64, yet which is sufficiently resilient to provide a yieldable support for the keyboard 64 so as to enhance the comfort of the operator during use. As shown, the keyboard stand 84 is preferably formed with a wrist rest portion 86 on the top of the forward edge 88 and has an end block 90 formed at the rear edge 92 to releasably retain the keyboard 64 on the reversely sloping surface 94 of the stand 84. In use, the stand 84 functions in substantially the same manner as described above with respect to the stand 62 of FIG. 3.

Obviously, numerous variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A keyboard comprising:
   a member having a raised forward edge, a lower rear edge, and an upper surface having a plurality of keys arranged in tiers descending in stepwise fashion toward said lower rear edge of said member,
   a base hingedly attached to said rear edge of said member, and
   resilient means interposed between said base and said member to normally urge said member upward.
2. The keyboard of claim 1 wherein:
   said resilient means is a spring.
3. The keyboard of claim 1 further comprising:
   means for adjusting the tension of said resilient means.
4. The keyboard of claim 1 further comprising:
   a wrist support provided on said raised forward edge of said member.
5. The keyboard of claim 4 wherein:
   said wrist support portion is cushioned.
6. The keyboard of claim 1 wherein:
   said keys have convex upper surfaces.
7. The keyboard of claim 1 further comprising:
   means for adjusting the height of said forward edge of said member.
8. The keyboard of claim 1 further comprising:
   means attachable to said keys to provide convex upper surfaces for said keys.
9. A keyboard base comprising:
   a member having a raised forward edge, a lower rear edge, and an upper surface sloping downwardly from said forward edge toward said lower rear edge of said member,
   said upper surface of said member serving to support a forwardly-sloping keyboard placed on top of said upper surface in a rearwardly sloping position, said upper surface having an end block located at said lower rear edge for releasably retaining said forwardly-sloping keyboard on said upper sloping surface.
10. The keyboard of claim 9 further comprising:
    means for adjusting the slope of said upper surface of said member.
11. The keyboard of claim 9 wherein:
    said member is a stand for supporting a forwardly-sloping keyboard in a reversely sloped position.
12. The device of claim 11 wherein:
    said member is a solid wedge formed of resilient material.
13. The device of claim 12 wherein: said member is formed of polyurethane.

* * * * *